A. BADOWSKI.
TRANSPARENT CAP FOR TIRE STEM PRESSURE GAUGES.
APPLICATION FILED OCT. 19, 1921.

1,429,315.   Patented Sept. 19, 1922.

Alfred Badowski
Inventor.

By

Attorney.

Patented Sept. 19, 1922.

1,429,315

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TRANSPARENT CAP FOR TIRE-STEM PRESSURE GAUGES.

Application filed October 19, 1921. Serial No. 508,738.

*To all whom it may concern:*

Be it known that I, ALFRED BADOWSKI, a citizen of the United States, residing at Charleston, in the county of Kanawha and State of West Virginia, have invented new and useful Improvements in Transparent Caps for Tire-Stem Pressure Gauges, of which the following is a specification.

It is desirable to provide tire stems having pressure gauges with transparent caps so that the pressure gauges may be observed at all times. It is difficult to form a transparent cap which is usually of glass so that it may be directly attached to the tire stem and it is, therefore, desirable to provide a metal base for the transparent tube which serves as a means for securing the cap to the base. The present invention is directed to a convenient manner of securing a transparent cap to a metal base.

The invention is illustrated in the accompanying drawings as follows:—

Figure 1:
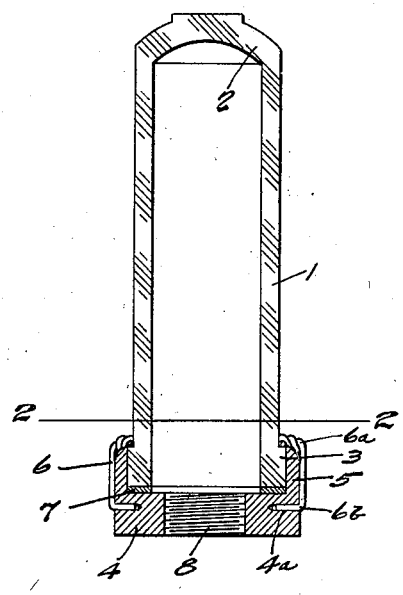

Fig. 1 shows a central vertical section through the center of the cap.

Figure 2:
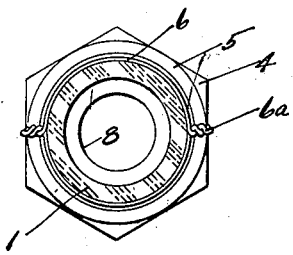

Fig. 2 a section on the line 2—2 in Fig. 1.

1 marks the tube, 2 a closure for the tube, 3 a shoulder at the bottom of the tube, 4 a metal base on which the tube is mounted, and 5 an upwardly extending annular projection on the base centering the tube on the base. A washer 7 such as felt is preferably provided between the end of the tube and the base and the base is provided with a screw-threaded opening 8 adapted to screw on to a tire stem permitting the pressure gauge to project into the transparent tube where it may be observed. Two strands of wire 6 are passed around the shoulder 3 and twisted at 6ª at the two sides so as to secure the wire on the shoulder and the ends 6ᵇ of the wire are bent and forced into the radial openings 4ª in the base, thus firmly securing the tube on the base.

What I claim as new is:—

1. A transparent cap for tire stem pressure gauges comprising a transparent tube having a closure at the top and open at the bottom and having an exterior shoulder at its bottom; a metal base; and a wire securing means encircling the tube over the shoulder and secured to the base.

2. A transparent cap for tire stem pressure gauges comprising a transparent tube having a closure at the top and open at the bottom and having an exterior shoulder at the bottom; a metal base having radial openings; and wire securing means encircling the tube over the shoulder, the ends of the wire extending into the radial openings for securing the wire to the base.

3. A transparent cap for tire stem pressure gauges comprising a transparent tube having a closure at the top and open at the bottom and having an exterior shoulder at its bottom; a metal base; and two strands of wire encircling the tube and twisted at each side with the ends secured to the base.

4. A transparent cap for tire stem pressure gauges comprising a transparent tube having a closure at the top and open at the bottom and having an exterior shoulder at its bottom; a metal base having radial openings therein; and two strands of wire encircling the tube over the shoulder and twisted each side with the ends extending into the base for securing the wire.

5. A transparent cap for tire stem pressure gauges comprising a transparent tube having a closure at the top and open at the bottom and having an exterior shoulder at its bottom; a metal base having an annular projection centering the tube; and a wire securing means encircling the tube over the shoulder and secured to the base.

In testimony whereof I have hereunto set my hand.

ALFRED BADOWSKI.